United States Patent [19]

Kokotailo et al.

[11] 4,187,283

[45] Feb. 5, 1980

[54] METHOD FOR IMPROVING ORGANIC CATION-CONTAINING ZEOLITES

[75] Inventors: George T. Kokotailo; Stephen Sawruk, both of Woodbury, N.J.

[73] Assignee: Mobil Oil Corporation, New York, N.Y.

[21] Appl. No.: 3,326

[22] Filed: Jan. 15, 1979

[51] Int. Cl.$^2$ .................. C01B 33/28; B01J 29/06
[52] U.S. Cl. .................. 423/328; 252/455 Z
[58] Field of Search .................. 423/328–330; 252/455 Z

[56] References Cited

U.S. PATENT DOCUMENTS

| | | | |
|---|---|---|---|
| 3,702,886 | 11/1972 | Argauer et al. | 423/328 |
| 3,766,093 | 10/1973 | Chu | 252/455 Z |
| 3,853,743 | 12/1974 | Schwartz | 252/455 Z |

*Primary Examiner*—Edward J. Meros
*Attorney, Agent, or Firm*—Charles A. Huggett; Raymond W. Barclay

[57] ABSTRACT

A method is provided for improving the adsorptive properties, catalytic capabilities and thermal stability of organic cation-containing crystalline zeolites which comprises the sequential steps of (1) heating said zeolite, under controlled temperature conditions, to decompose organic material contained in the zeolite without effecting coking thereof, (2) heating said zeolite, under controlled temperature conditions, in an aqueous monovalent metal salt solution, and then (3) calcining the so treated zeolite. Steps (1) and (2) may be repeated, if desired, in sequence, prior to the calcining step (3).

13 Claims, No Drawings

METHOD FOR IMPROVING ORGANIC CATION-CONTAINING ZEOLITES

BACKGROUND OF THE INVENTION

1. Field of the Invention

This invention relates to a method for improving the adsorptive properties, catalytic capabilities and thermal stability of crystalline zeolites which, as formed, contain organic cations.

Further, this invention relates to use of zeolites treated in accordance herewith for adsorption and as catalyst components for conversion of organic compounds.

2. Description of Prior Art

Zeolite materials, both natural and synthetic, have been demonstrated in the past to have catalytic properties for various types of hydrocarbon conversions. Certain zeolitic materials are ordered, porous crystalline aluminosilicates having a definite crystalline structure within which there are a large number of smaller cavities which may be interconnected by a number of still smaller channels. Since the dimensions of these pores are such as to accept for adsorption molecules of certain dimensions while rejecting those of larger dimensions, these materials have come to be known as "molecular sieves" and are utilized in a variety of ways to take advantage of these properties.

Such molecular sieves, both natural and synthetic, include a variety of positive ion-containing crystalline aluminosilicates. These aluminosilicates can be described as a rigid three-dimensional framework of $SiO_4$ and $AlO_4$ in which the tetrahedra are cross-linked by the sharing of oxygen atoms whereby the ratio of the total aluminum and silicon atoms to oxygen is 1:2. The electrovalence of the tetrahedra containing aluminum is balanced by the inclusion in the crystal of a cation, for example, an alkali metal or an alkaline earth metal cation. This can be expressed wherein the ratio of aluminum to the number of various cations, such as Ca/2, Sr/2, Na, K or Li is equal to unity. One type of cation may be exchanged either entirely or partially by another type of cation utilizing ion exchange techniques in a conventional manner. By means of such cation exchange, it has been possible to vary the properties of a given aluminosilicate by suitable selection of the cation. The spaces between the tetrahedra are occupied by molecules of water prior to dehydration.

Prior art techniques have resulted in the formation of a great variety of synthetic aluminosilicates. These aluminosilicates have come to be designated by letter or other convenient symbols, as illustrated by zeolite A (U.S. Pat. No. 2,882,243), zeolite X (U.S. Pat. No. 2,882,244), zeolite Y (U.S. Pat. No. 3,130,007), zeolite ZK-5 (U.S. Pat. No. 3,247,195), zeolite ZK-4 (U.S. Pat. No. 3,314,752) and zeolite ZSM-5 (U.S. Pat. No. 3,702,886) merely to name a few.

Some of the aforementioned zeolites heretofore synthesized contain organic cations or mixed organic and metal cations. A number of these organic cation-containing zeolites have undesirably low adsorptive properties and become amorphous or lose their crystalline structure if subjected to elevated temperatures such as are necessary to remove the organic material in the channels or expel any adsorbed material. Thus, because of diffusion limitations, high temperature for extended periods of time are often required to oxidize the organic material in the channel system and such rigorous treatment tends to disrupt the zeolite framework, adversely affecting its stability and adsorptive properties.

SUMMARY OF THE INVENTION

In accordance with the present invention, there is provided a method for removing organic material from organic cation-containing zeolites without disrupting the framework structure of the zeolite and even possibly reinforcing it. The method of the invention serves to improve the adsorptive properties, catalytic capabilities and thermal stability of the organic cation-containing zeolites so treated.

In general, the method described herein comprises the sequential steps of (1) heating the organic-cation-containing zeolite at a temperature within the approximate range of 150° to 600° C. for a period of time sufficient to decompose organic material contained in the zeolite without effecting coking thereof, (2) contacting the resulting product with an aqueous solution of a monovalent metal salt at a temperature between about 50° and about 120° C. for a period of time sufficient to expel at least a major proportion of the decomposition products of said organic material and (3) calcining the product so obtained at a temperature of at least about 500° C. but below a temperature at which crystallinity of the zeolite is adversely affected. During the latter step, it is expected that any residue not previously expelled during step (2) is removed by combustion.

Steps (1) and (2) of this process may be repeated in that order, if desired, prior to the calcining step (3). The method of this invention, therefor, involves, as a minimum, steps (1), (2) and (3) sequentially. It may involve, if desired, the sequence of steps (1), (2), (1), (2) and (3) or (1), (2), (1), (2), (1), (2) and (3), etc.

DESCRIPTION OF SPECIFIC EMBODIMENTS

It is contemplated that organic cation-containing zeolites, regardless of origin, may be effectively improved by the method of this invention. Usually, these zeolites have been hydrothermally synthesized from sources of alkali metal oxides, organic cations, aluminum oxide, silicon dioxide and water.

Typical organic cations present in the zeolites contemplated for treatment in accordance with the method described herein include tetramethylammonium, tetraethylammonium, tetrapropylammonium, tetrabutylammonium, tetrabutylphosphonium, and organic nitrogen-containing cations derived from ethylenediamine, pyrrolidine or 2-(hydroxyalkyl)trialkylammonium compounds, e.g., 2-(hydroxyethyl)trimethylammonium chloride.

Representative of the zeolites, which may be effectively treated by the method of this invention, are ZSM-5, ZSM-6, ZSM-11, ZSM-12, ZSM-35, ZSM-38, ZSM-47 and similar materials. U.S. pat. No. 3,702,886 describing and claiming ZSM-5 is incorporated herein by reference.

ZSM-11 is more particularly described in U.S. Pat. No. 3,709,979, the entire contents of which are incorporated herein by reference.

ZSM-12 is more particularly described in U.S. Pat. No. 3,832,449, the entire contents of which are incorporated herein by reference.

ZSM-35 is more particularly described in U.S. Pat. No. 4,016,245, the entire contents of which are incorporated by reference.

ZSM-38 is more particularly described in U.S. Pat. No. 4,046,859, the entire contents of which are incorporated by reference.

ZSM-6 is more particularly described in U.S. patent application Ser. No. 862,307, filed Dec. 20, 1977. This zeolite has a formula, in terms of mole ratios of oxides and in the anhydrous state, as follows: (0.1 to 1.5)$R_2O$:(0.01 to 1.49)$M_2O$:$Al_2O_3$:(25 to 130)$SiO_2$ where R is a nitrogen-containing cation, such as that derived from a tetramethylammonium compound and M is an alkali metal cation, e.g., sodium.

The ZSM-6 zeolite possesses a definite crystalline structure whose X-ray diffraction pattern shows substantially the significant lines set forth in the following table:

TABLE 1

| d(A) | I/Io |
|---|---|
| 11.6 ± 0.2 | Weak |
| 9.0 ± 0.15 | Weak |
| 8.33 ± 0.14 | Strong |
| 6.64 ± 0.11 | Medium |
| 6.55 ± 0.11 | Weak |
| 6.27 ± 0.11 | Strong |
| 5.77 ± 0.10 | Weak |
| 5.41 ± 0.09 | Weak |
| 4.65 ± 0.08 | Weak |
| 4.48 ± 0.08 | Strong |
| 4.33 ± 0.07 | Strong |
| 4.24 ± 0.07 | Weak |
| 4.17 ± 0.07 | Weat |
| 4.11 ± 0.07 | Medium |
| 4.05 ± 0.07 | Very Strong |
| 4.01 ± 0.07 | Medium |
| 3.97 ± 0.07 | Strong |
| 3.91 ± 0.07 | Very Strong |
| 3.85 ± 0.07 | Medium |
| 3.80 ± 0.06 | Weak |
| 3.76 ± 0.06 | Weak |
| 3.72 ± 0.06 | Weak |
| 3.56 ± 0.06 | Medium |
| 3.45 ± 0.06 | Weak |
| 3.31 ± 0.06 | Weak |
| 3.27 ± 0.06 | Weak |
| 3.16 ± 0.05 | Weak |
| 3.13 ± 0.05 | Weak |
| 3.03 ± 0.05 | Weak |
| 3.01 ± 0.05 | Weak |
| 2.98 ± 0.05 | Weak |
| 2.95 ± 0.05 | Weak |
| 2.89 ± 0.05 | Weak |
| 2.84 ± 0.05 | Weak |
| 2.80 ± 0.05 | Weak |
| 2.77 ± 0.05 | Weak |

Zeolite ZSM-6 can be suitably synthesized by preparing a solution containing sources of an alkali metal oxide, preferably sodium oxide or hydroxide, sources of organic nitrogen-containing cation, preferably tetramethylammonium chloride or hydroxide, aluminum oxide, silicon dioxide and water and having a composition, in terms of mole ratios of oxides, falling within the following ranges:

$R^+/(R^+ + M^+) = 0.1 - 0.99$ $OH^-/SiO_2 = 0.001 - 0.25$ $H_2O/OH^- = 50 - 150$ $SiO_2/Al_2O_3 = 25 - 300$ wherein R is an organic nitrogen-containing cation and M is an alkali metal ion, and maintaining the mixture until crystals of the zeolite are formed. The quantity of $OH^-$ is calculated only from the inorganic sources of alkali without any organic base contribution. Thereafter, the crystals are separated from the liquid reaction medium such as by cooling the whole to room temperature, filtering and water washing. Typical reaction conditions consist of heating the foregoing reaction mixture to a temperature of from about 100° C. to about 177° C. for a period of time of from about 48 hours to about 60 days. A more preferred temperature range is from about 100° C. to about 150° C. with the amount of time at a temperature in such range being from about 4 days to about 60 days.

The composition for the synthesis of synthetic ZSM-6 can be prepared utilizing materials which can supply the appropriate oxide. Such compositions include aluminates, alumina, silicates, silica hydrosol, silica gel, silicic acid and hydroxides. It will be understood that each oxide component utilized in the reaction mixture for preparing ZSM-6 can be supplied by one or more essential reactants and they can be mixed together in any order. For example, any oxide can be supplied by an aqueous solution, sodium hydroxide or by an aqueous solution of a suitable silicate; the cation derived from a tetramethylammonium compound can be supplied by the hydroxide or halide. The reaction mixture can be prepared either batchwise or continuously. Crystal size and crystallization time of the ZSM-6 composition will vary with the nature of the reaction mixture employed.

ZSM-47 is more particularly described in U.S. patent application Ser. No. 862,459 filed Dec. 20, 1977. This zeolite has a formula in terms of mole ratios of oxides and in the anhydrous state, as follows: (0.01 to 0.3)$M_2O$:(0.6 to 1.6)$R_2O$:$Al_2O_3$:(15 to 50) $SiO_2$ where R is a nitrogen-containing organic cation, such as that derived from a 2-(hydroxyalkyl)trialkylammonium compound, the alkyl groups of which are methyl, ethyl or a combination thereof, such as, for example, 2-(hydroxyethyl)-trimethylammonium chloride or from a tetramethylammonium compound and M is an alkali metal cation, e.g., sodium, potassium or rubidium.

The ZSM-47 zeolite possesses a definite crystalline structure where X-ray diffraction pattern shows substantially the significant lines set forth in the following table:

TABLE 2

| d(A) | I/Io |
|---|---|
| 11.6 ± 0.2 | Weak |
| 9.00 ± 0.15 | Weak |
| 8.41 ± 0.14 | Strong |
| 6.60 ± 0.11 | Medium |
| 6.27 ± 0.11 | Strong |
| 5.71 ± 0.10 | Weak |
| 5.42 ± 0.09 | Weak |
| 4.65 ± 0.08 | Weak |
| 4.48 ± 0.08 | Strong |
| 4.34 ± 0.07 | Strong |
| 4.12 ± 0.07 | Strong |
| 4.06 ± 0.07 | Very Strong |
| 4.00 ± 0.07 | Very Strong |
| 3.89 ± 0.07 | Very Strong |
| 3.73 ± 0.06 | Weak |
| 3.55 ± 0.06 | Medium |
| 3.29 ± 0.06 | Medium |
| 3.15 ± 0.05 | Weak |
| 3.13 ± 0.05 | Weak |
| 3.03 ± 0.05 | Weak |
| 2.99 ± 0.05 | Weak |
| 2.94 ± 0.05 | Weak |
| 2.89 ± 0.05 | Weak |
| 2.85 ± 0.05 | Weak |
| 2.80 ± 0.05 | Weak |

TABLE 2-continued

| d(A) | I/Io |
|---|---|
| 2.77 ± 0.05 | Weak |
| 2.70 ± 0.05 | Weak |

Zeolite ZSM-47 can be suitably synthesized by preparing a solution containing sources of sodium oxide, nitrogen-containing organic cations, preferably a 2-(hydroxyalkyl)trialkylammonium compound or a tetramethylammonium compound, aluminum oxide, silicon dioxide and water and having a composition, in terms of mole ratios of oxides falling within the following ranges:

$R^+/(R^+ + M^+) + 0.01-1.0$ $OH^-/SiO_2 + 0.1-0.8$ $H_2O/OH^- + 10-100$ $SiO_2/Al_2O_3 + 10-80$ wherein R is an organic nitrogen-containing cation and M is an alkali metal ion and maintaining the mixture until crystals of the zeolite are formed. Thereafter, the crystals are separated from the liquid reaction medium, as by cooling the whole to room temperature, filtering and water washing. Typical reaction conditions consist of heating the foregoing reaction mixture to a temperature of from about 75° C. to about 175° C. for a period of time of from about 6 hours to about 150 days. A more preferred temperature range is from about 90° C. to about 150° C. with the amount of time at a temperature in such range being from about 24 hours to about 105 days.

The composition for the synthesis of synthetic ZSM-47 can be prepared utilizing materials which can supply the appropriate oxide. Such compositions include aluminates, alumina, silicates, silica hydrosol, silica gel, silicic acid and hydroxides. It will be understood that each oxide component utilized in the reaction mixture for preparing ZSM-47 can be supplied by one or more essential reactants and they can be mixed together in any order. For example, any oxide can be supplied by an aqueous solution, sodium hydroxide or by an aqueous solution of a suitable silicate. The silicon dioxide reactant may be a finely dispersed, highly reactive silica such as obtained by precipitation from an aqueous solution of a silicate or by vapor-phase hydrolysis of a silicon halide, e.g., chloride or bromide. The silicon dioxide may also be provided as a colloidal silica sol. The reaction mixture can be prepared either batchwise or continuously. Crystal size and crystallization time of the ZSM-47 composition will vary with the nature of the reaction mixture employed.

In addition to the foregoing, natural zeolites may be converted to organic-cation containing zeolites by various treatments, such as base exchange. Natural minerals which may be so treated include ferrierite, brewsterite, stilbite, dachiardite, epistilbite, heulandite and clinoptilolite.

The first step in the present method of crystalline zeolite treatment involves heating the organic cation-containing zeolite to a temperature of from about 150° C. to about 600° C., preferably from about 250° C. to about 500° C., in an inert atmosphere, e.g., air or ammonia for a time sufficient to decompose organic material contained in the zeolite without effecting coking thereof. Such period of time will generally be between about 1 and about 10 hours and preferably between about 2 and about 8 hours, whereby at least substantial portion of the organic material contained therein is decomposed while the crystal structure of said zeolite is maintained. The exact temperature and treatment time for this first step will vary within the above ranges depending upon the zeolite being treated. Comparable results can be obtained by exposure at a lower temperature for a long period of time or at a higher temperature for a short period of time. It will be understood that treating conditions will be chosen so as to avoid appreciable coke build-up as well as crystal structure degradation.

The second step in the present method of crystalline zeolite treatment involves contacting the zeolite product of the first step with aqueous solution of a monovalent salt at a temperature between about 50° C. and about 120° C. and preferably at approximately 100° C. for a time sufficient to expel at least a major portion of the organic material contained therein. Generally, such period of time will be between about 1 and about 10 hours and preferably between 2 and about 8 hours. The aqueous solution of a monovalent metal salt for this step of the present treatment method may be from about 0.1 to about 2 molar, preferably from about 0.5 to about 1 molar. The monovalent salt may be a salt of a metal from Group IA of the Periodic Table of Elements i.e., a salt of an alkali metal such as, for example, sodium or potassium. Non-limiting examples of such salts include sodium chloride, potassium chloride, sodium bromide, sodium sulfate, potassium bromide, sodium acetate, sodium nitrate, etc. The exact temperature and treatment time for this second step will vary within the above ranges, depending upon the zeolite being treated, as well as the concentration of the treating solution, and will be chosen so as to promote expulsion of organic material decomposition products formed during the first step of the treatment method.

The first and second steps of this method may, if desired, be repeated sequentially any number of times.

The third step in the present method of crystalline zeolite treatment involves heating the zeolite product of the second step in a combustion-supporting medium, e.g., air, at least about 500° C. but below a temperature at which crystallinity of the zeolite is adversely affected. Generally, such temperature will be within the approximate range of 500° C. to 650° C. to burn off any residue which has not been expelled during the second step. Generally, such period of time will be between about 1 and about 24 hours and preferably between about 2 and about 16 hours.

In practicing organic compound conversion with a zeolite treated in accordance herewith as catalyst, said zeolite may be incorporated with a matrix or support material which is resistant to high temperatures or which imparts a degree of ease in handling. Such matrix materials include synthetic or naturally occurring substances such as clay, silica and/or metal oxides. The latter may be either naturally occurring or in the form of gelatinous precipitates or gels including mixtures of silica and metal oxides. Naturally occurring clays which can be composited with the modified solid materials include those of the montmorillonite and kaoline families which include the sub-bentonites and the kaolins commonly known as Dixie, McNamee, Georgia and Florida clays or others in which the main mineral constituent is halloysite, kaolinite, dickite, nacrite or anauxite. Such clays can be used in the raw state as originally mined or initially subjected to calcination, acid treatment or chemical modification.

In addition to the foregoing materials, the treated zeolites of this invention may be composited with a porous matrix material, such as silica, alumina, silica-alumina, silica-magnesia, silica-zirconia, silica-thoria, silica-berylia, silica-titania as well as ternary compositions such as silica-alumina-thoria, silica-alumina-zirconia, silica-alumina-magnesia and silica-magnesia-zirconia. The matrix may be in the form of a cogel. The relative proportions of finely divided zeolite treated in accordance herewith and inorganic oxide gel matrix may vary widely with the zeolite content ranging from between about 1 to about 99 percent by weight and more usually in the range of about 5 to about 80 percent by weight of the composite.

The zeolites as above treated are particularly suitable for use as catalysts in the conversion of organic compounds such as hydrocarbons. In particular, they find utility in catalytic cracking and hydrocracking operations as well as other similar type processes. Certain of the so treated zeolites may be impregnated with salts or ion exchanged with cations from Groups I-VIII of the Periodic Table which may subsequently be reduced if desired. They may also be used in such catalytic conversions of hydrocarbons as, for example, alkylation, dealkylation, transalkylation, isomerization, hydrogenation, dehydrogenation, dehydrohalogenation, dehydrocyclization, and the like.

In order to more fully illustrate the nature of the invention and the manner of practicing same, the following examples are presented.

In the examples which follow, whenever adsorption data are set forth for comparison of sorptive capacities for water, cyclohexane, and n-hexane, they were determined as follows:

A weighed sample of the calcined zeolite was contacted with the desired pure adsorbate vapor in an adsorption chamber, evacuated to 12 mm when checking capacity for water and 20 mm when checking capacity for cyclohexane and n-hexane, pressures less than the vapor-liquid equilibrium pressure of the respective adsorbate at room temperature. The pressure was kept constant (within about ±0.5 mm) by addition of adsorbate vapor controlled by a manostat during the adsorption period which did not exceed about eight hours. As adsorbate was adsorbed by the zeolite, the decrease in pressure caused the manostat to open a valve which admitted more adsorbate vapor to the chamber to restore the above control pressures. Sorption was complete when the pressure change was not sufficient to activate the manostat. The increase in weight was calculated as the adsorption capacity of the sample.

The following specific examples will serve to illustrate the method of the present invention without unduly limiting the same:

EXAMPLE 1

A zeolite, identified as ZSM-47, was prepared by dissolving 4.35 grams of sodium aluminate (41.8% $Al_2O_3$, 31.6% $Na_2O$ and 24.9% $H_2O$) and 4.5 grams of NaOH in 24.6 grams of a 50 percent aqueous solution of tetramethylammonium chloride. To the resulting solution was added 109 grams of colloidal silica (30% $SiO_2$ and 70% $H_2O$). The mixture, which was stirred 15 minutes and transferred to a glass-lined autoclave, had the following molar ratios:

$SiO_2/Al_2O_3 = 30.6$ $R^+/R^+ + M^+ = 0.26$ where $M = Na$ and $R = (CH_3)_4N$ $OH^-/SiO_2 = 0.29$ $H_2O/OH^- = 31.8$ Crystallization was carried out for 7 days at 300° F. The crystals were water washed, dried at 230° F.

The final product had the following chemical composition:

|       | Wt. Percent |
|-------|-------------|
| N     | = 0.70      |
| Na    | = 0.37      |
| $Al_2O_3$ | = 5.0   |
| $SiO_2$ | = 93.6    |
| Ash   | = 84.4      |

A 2 gram sample of the above zeolite was heated in air for 2 hours at 500° C. Thereafter, the heated sample was contacted for 4 hours with 300 cc of a 1 molar aqueous solution of sodium chloride at a temperature of 100° C. The resulting product was water washed, filtered and dried for 5 hours at 500° C. in air. The dried product was then again contacted for 4 hours with 300 cc of a 1 molar aqueous sodium chloride solution at 100° C., water washed, filtered and heated in air for 24 hours at 500° C.

EXAMPLE 2

A 2 gram sample of the above ZSM-47 zeolite was heated in air for 4 hours at 500° C. Thereafter, the heated sample was contacted for 4 hours with 300 cc of a 1 molar aqueous solution of sodium chloride at a temperature of 100° C. The resulting product was water washed,, filtered and dried for 2 hours at 500° C. in air. The dried product was then again contacted for 4 hours with 300 cc of a 1 molar aqueous sodium chloride solution at 100° C., water washed, filtered and heated in air for 24 hours at 500° C.

EXAMPLE 3

A 2 gram sample of the above ZSM-47 zeolite was heated in air for 24 hours at 500° C.

EXAMPLE 4

A zeolite, identified as ZSM-47, was prepared by adding 33.5 grams of choline chloride to a solution containing 5.06 grams of sodium aluminate (43.1% $Al_2O_3$, 33.1% $Na_2O$ and 24.3% $H_2O$), 6.35 grams NaOH, 1.76 grams KOH (86.4%) and 80 grams $H_2O$. To the resulting solution, was added 115 grams of colloidal silica (30% $SiO_2$ and 70% $H_2O$).

The composition of the mixture so formed was:

$SiO_2/Al_2O_3 = 25.6$ $R^+/R^+ + M^+ = 0.489$ where $M = K + Na$ and $R = (CH_3)_3N\text{---}CH_2CH_2OH$ $OH^-/SiO_2 = 0.46$ $H_2O/OH^- = 35.5$ $R_2O/M_2O = 0.1$ The gel was mixed for 15 minutes, transferred to a glass-lined autoclave and crystallized at 270° F. for 34 days. The resultant crystals were water washed and dried at 250° F.

The final product had the following chemical composition:

|   | Wt. Percent |
|---|---|
| N | 2.22 |
| Na | 0.07 |
| K | 0.023 |
| $Al_2O_3$ | 5.08 |
| $SiO_2$ | 89.6 |
| Ash | 84.7 |

A portion of the product calcined for 16 hours at 1000° F. had the following sorption and surface area:

Cyclohexane = 2.7 percent

N-hexane = 2.4 percent $H_2O$ = 11.5 percent

Surface Area, m2/g = 78

A 2 gram sample of the above zeolite was subjected to the treatment described in Example 1.

EXAMPLE 5

A 2 gram sample of the ZSM-47 zeolite prepared as in Example 4 was subjected to the treatment described in Example 2.

EXAMPLE 6

A 2 gram of the ZSM-47 zeolite prepared as in Example 4 was subjected to the treatment described in Example 3.

EXAMPLE 7

A zeolite, identified as ZSM-6, was prepared by mixing 50 grams of powdered silica, 9 grams of NaOH (98.7%)., 7 grams of $Al_2(SO_4)_3.14H_2O$, 50 grams tetramethylammonium chloride (50% solution) and 200 cc of water. The resulting slurry was conducted to a bomb maintained initially at a pressure of 38 psig and a temperature of about 330° F. After a period of about 7 days, a crystal product was obtained which was identified as ZSM-6.

A 2 gram sample of the above ZSM-6 zeolite was heated in air for 16 hours at 250° C. Thereafter, the heated sample was contacted for 4 hours with 300 cc of a 1 molar aqueous solution of sodium chloride at a temperature of 100° C. The resulting product was water washed, filtered, and dried for 19 hours at 250° C. in air. The dried product was then again contacted for 4 hours with 300 cc of a 1 molar aqueous sodium chloride solution at 100° C., water washed, filtered and heated in air for 24 hours at 500° C.

EXAMPLE 8

A 2 gram of the above ZSM-6 zeolite was heated in air for 72 hours at 325° C. The heated sample was then contacted for 5 hours with 300 cc of a 1 molar aqueous solution of sodium chloride at 100° C. The resulting product was water washed, filtered and heated in air for 24 hours at 500° C.

EXAMPLE 9

A 2 gram sample of the above ZSM-6 zeolite was subjected to the treatment described in Example 1.

EXAMPLE 10

A 2 gram sample of the above ZSM-6 zeolite was heated in ammonia for 4 hours at 500° C.

EXAMPLE 11

A 2 gram sample of the above ZSM-6 zeolite was heated in air for 24 hours at 500° C.

EXAMPLE 12

A zeolite, identified as ZSM-47, was prepared by mixing 160 grams of Q Brand sodium silicate, 200 grams of tetramethylammonium chloride (50 percent solution) and 500 ml. of water. The resulting solution was permitted to stand for several days at 100° C. until the formation of a crystal product, which was identified as ZSM-47.

A 2 gram sample of the above ZSM-47 zeolite was heated in air for 26 hours at 250° C. The heated sample was then contacted for 4 hours with 300 cc of a 1 molar aqueous sodium chloride solution at a temperature of 100° C. The resulting product was water washed, filtered and dried for 26 hours at 250° C. in air. The dried product was again contacted for 4 hours with 300 cc of a 1 molar aqueous sodium chloride solution at 100° C., water washed, filtered and heated in air for 4 hours at 500° C.

EXAMPLE 13

A 2 gram sample of the ZSM-47 zeolite prepared as in Example 12 was heated in air for 4 hours at 500° C.

EXAMPLE 14

A zeolite, identified as ZSM-12 was prepared by mixing 2405 grams of powdered silica (90.5% solids), 37 grams of $Al(NO_3)_3.3H_2O$, 1480 grams of tetraethylammonium bromide, 233.6 grams of NaOH (98%) and 11,470 grams of water. Initially, all of the above with the exception of the silica were combined and put in a 5 gallon autoclave. Mixing in the autoclave was started with slow addition of the silica. Stirring was continued at 180 RPM until silica addition completed and thereafter at 315° F. for 21 hours. The resulting crystalline product was washed, dried and identified as ZSM-12.

A 2 gram sample of the above prepared ZSM-12 zeolite was heated in air for 24 hours at 250° C. The heated sample was then contacted for 5 hours with 300 cc of a 1 molar aqueous solution of sodium chloride at a temperature of 100° C. The resulting product was water washed, filtered and dried for 26 hours at 250° C. in air. The dried product was again contacted for 4 hours with 300 cc of a 1 molar aqueous sodium chloride solution, water washed, filtered and heated in air for 24 hours at 500° C.

EXAMPLE 15

A 2 gram sample of the above ZSM-12 zeolite was heated in air for 24 hours at 250° C. Thereafter, the heated sample was contacted for 4 hours with 300 cc of a 1 molar queous solution of sodium chloride at 100° C. The resulting product was water washed, filtered and dried in air for 24 hours at 500° C.

EXAMPLE 16

A zeolite, identified as ZSM-5 was prepared as follows: A sodium silicate solution was prepared by mixing 90.9 lb of silicate, a commercial sodium silicate, 20 g. of a commercial dispersant and 52.6 lb of water. An acid alum solution was prepared by mixing 2850 g. of $Al_2(SO_4)_3.18H_2O$, 3440 g of $H_2SO_4$, 4890 g. of NaCl and 54 lb of water. The above two solutions were nozzle mixed together to form into gel in a 30 gallon autoclave. Additional 2840 g. of NaCl were added and mixed into the gel. On top of the gel, 2780 g of tri-n-propylamine, 2390 g of n-propylbromide and 4590 g. of methyl ethyl ketone were added. The crystallization was carried out in three stages: 2 hours of pre-reaction at 210° F. without agitation, about 60 hours at 228° F. with 250 rpm agitation, and about 5.3 hours at 325° F. with 250 rpm agitation. The crystallized product was 100% ZSM-5 as measured by x-ray diffraction. The washed and dried product was analyzed and was found to be by wt. 95% $SiO_2$, 3.99% $Al_2O_3$, 0.9% Na, 0.4% N, 7.58% C, and 90.9% ash.

A 2 gram sample of the above prepared ZSM-5 was heated in air for 24 hours at 250° C. The heated zeolite was then contacted for 5 hours with 300 cc of a 1 molar aqueous solution of sodium chloride at 100° C. The resulting product was then again heated in air for 26 hours at 250° C. and again contacted with the above sodium chloride solution for 4 hours at 100° C. The product obtained was water washed, filtered and dried in air for 24 hours at 500° C.

EXAMPLE 17

A zeolite was prepared from the following solutions:
Solution A

NaAlO$_2$ 4.96 grams
NaOH (50%) 0.81 grams
H$_2$O 144 grams
Solution B

Colloidal Silica (30% SiO$_2$-70% H$_2$O) 158.4 grams
Solution C

Tetramethyleneamine
(TME) (pyrrolidine) 86.4 grams
Solution C was added to Solution A and stirred until a clear solution resulted. The solution so obtained was added to Solution B and rapidly stirred for 10 minutes. The gel so obtained was placed in a plastic lined bomb and 36 cc of water was added. The product was maintained at 174° C. for 52 days to yield a crystalline material identified as TME ferrierite.

A 2 gram sample of the above zeolite was heated in air for 22 hours at 250° C. and then contacted for 6 hours with 300 cc of a 1 molar aqueous sodium chloride solution at 100° C. The resulting product was water washed, filtered and dried in air for 24 hours at 250° C. The dried product was again contacted for 4 hours with 300 cc of a 1 molar aqueous sodium chloride solution at 100° C., water washed, filtered and heated in air for 24 hours at 500° C.

EXAMPLE 18

A 2 gram sample of the above TME ferrierite was subjected to the treatment described in Example 1.

EXAMPLE 19

A 2 gram sample of the above TME ferrierite prepared as in Example 17 was heated in air for 24 hours at 500° C.

Products of the above examples were examined for relative crystallinity. The sample with the highest crystallinity was assigned a value of 100 percent crystallinity. The intensities of the main diffraction lines were measured. The average ratio of the intensity of each line in the X-ray diffraction pattern of a sample and that of the equivalent line in the 100 percent crystallinity sample multiplied by 100 gave the relative crystallinity of the sample. The results of such examination are reported in Table 3 below.

Adsorption properties of the above products, as well as the recited zeolites, were also determined for water, cyclohexane and normal hexane. Adsorption expressed as grams per 100 grams of product was determined as follows: A weighed sample of the zeolite was contacted with the desired pure adsorbate vapor in an adsorption chamber at a pressure less that the vapor-liquid equilibrium pressure of the adsorbate at room temperature. This pressure was kept constant during the adsorption period which did not exceed about eight hours. Adsorption was complete when a constant pressure in the adsorption chamber was reached, i.e., 12 mm of mercury for water and 20 mm of n-hexane and cyclohexane. The increase in weight was calculated as the adsorption capacity of the sample. Results are set forth in the following table:

TABLE 3

| Zeolite | Product of Example | Relative Crystallinity | Adsorption gm/100 gm | | |
|---|---|---|---|---|---|
| | | | H$_2$O | Cyclohexane | N-hexane |
| ZSM-47 | Untreated | | 1.7 | 0.9 | 0.7 |
| ZSM-47 | 1 | 100 | 14.9 | 5.0 | 5.8 |
| ZSM-47 | 2 | | 11.6 | 3.1 | 2.4 |
| ZSM-47 | 3 | 85 | 11.5 | 2.7 | 2.4 |
| ZSM-47 | 4 | 100 | 13.0 | 5.8 | 2.3 |
| ZSM-47 | 5 | 93 | 13.6 | 4.4 | 4.3 |
| ZSM-47 | 6 | 91 | 11.7 | 2.7 | 2.3 |
| ZSM-6 | 7 | 100 | 11.9 | 4.1 | 2.9 |
| ZSM-6 | 8 | | 8.6 | 2.3 | 1.6 |
| ZSM-6 | 9 | | 8.1 | 1.5 | 3.0 |
| ZSM-6 | 10 | 48 | 9.2 | 0.7 | 0.8 |
| ZSM-6 | 11 | 67 | 8.3 | 0.7 | 1.3 |
| ZSM-47 | 12 | 26 | 5.2 | 4.5 | 1.5 |
| ZSM-47 | 13 | 0 | | | |
| ZSM-12 | Untreated | | 7.8 | 7.5 | 6.5 |
| ZSM-12 | 14 | | 6.7 | 7.6 | 7.6 |
| ZSM-12 | 15 | | 6.9 | 9.5 | 8.0 |
| ZSM-5 | Untreated | | 7.2 | 7.8 | 11.1 |
| ZSM-5 | 16 | 10 | 9.8 | 8.2 | 12.3 |
| TME Ferrierite | Untreated | | 9.0 | 1.0 | 5.4 |
| TME Ferrierite | 17 | | 11.3 | 4.2 | 9.0 |
| TME Ferrierite | 18 | | 10.0 | 1.9 | 8.5 |
| TME Ferrierite | 19 | 73 | | | |

It will be seen from the above results that ZSM-47 (Examples 1-6) showed considerable improvement in adsorptive properties after treatment in accordance with the method of the invention. Likewise, the adsorptive capacity of ZSM-6 was improved considerably by this method (Examples 7-11). It will further be evident that the adsorptive capacity increased with decreased temperature at which the organic material was decomposed.

From the results of Examples 12 and 13, it will be seen that the sample treated which is a mixture of ZSM- 47 and an unstable material became completely amorphous when calcined at 500° C. for 4 hours, but that thermal decomposition of the organic material at a low temperature, followed by boiling in sodium chloride solution and calcination for 4 hours at 500° C. resulted in improvement in crystallinity and adsorptive capacity.

In the case of ZSM-12 (Examples 14 and 15), it is of interest to note that low temperature treatment served to improve hexane and cyclohexane adsorption. Similarly, low temperature treatment of ZSM-5 (Example 16) and TME Ferrierite (Examples 17-19) showed improvement in adsorption of water, cyclohexane and normal hexane.

What is claimed is:

1. A method for improving the adsorptive properties of an organic cation-containing crystalline zeolite which comprises (1) heating said zeolite at a temperature within the approximate range of 150° to 600° C. for a period of time sufficient to decompose organic material contained in the zeolite without effecting coking thereof, (2) contacting the resulting product with an aqueous solution of a monovalent metal salt at a temperature between about 50° and about 120° C. for a period of time sufficient to expel at least a major portion of the decomposition products of said organic material and (3) calcining the product so obtained at a temperature of at least about 500° C. but below a temperature at which crystallinity of said zeolite is adversely affected.

2. The method of claim 1 wherein the temperature in step (1) is within the approximate range of 250° to 500° C.

3. The method of claim 1 wherein said monovalent metal salt is a salt of an alkali metal.

4. The method of claim 1 wherein said monovalent metal salt is a sodium salt.

5. The method of claim 1 wherein said monovalent metal salt is sodium chloride.

6. The method of claim 1 wherein said zeolite is ZSM-5.

7. The method of claim 1 wherein said zeolite is ZSM-47.

8. The method of claim 1 wherein said zeolite is ZSM-6.

9. The method of claim 1 wherein said zeolite is ZSM-12.

10. The method of claim 1 wherein said zeolite is TME Ferrierite.

11. The method of claim 1 wherein the concentration of said monovalent metal salt is between about 0.1 and about 2 molar.

12. The method of claim 1 wherein said contacting with an aqueous solution of a monovalent metal salt takes place at approximately 100° C.

13. The method of claim 1 wherein steps (1) and (2) are sequentially repeated prior to step (3).

* * * * *